US012170486B2

(12) United States Patent
Li et al.

(10) Patent No.: US 12,170,486 B2
(45) Date of Patent: Dec. 17, 2024

(54) CONTROL CIRCUIT OF SWITCHING MODE POWER SUPPLY AND CONTROL METHOD THEREOF

(71) Applicant: Chengdu Monolithic Power Systems Co., Ltd., Chengdu (CN)

(72) Inventors: Hui Li, Hangzhou (CN); Siran Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 217 days.

(21) Appl. No.: 17/875,828

(22) Filed: Jul. 28, 2022

(65) Prior Publication Data

US 2023/0034190 A1 Feb. 2, 2023

(30) Foreign Application Priority Data

Jul. 29, 2021 (CN) .......................... 202110865505.4

(51) Int. Cl.
*H02M 3/335* (2006.01)
*H02M 1/00* (2007.01)

(52) U.S. Cl.
CPC ..... *H02M 3/33523* (2013.01); *H02M 1/0025* (2021.05)

(58) Field of Classification Search
CPC ............. H02M 1/0025; H02M 1/0032; H02M 1/0058; H02M 1/083; H02M 3/33507; H02M 3/33523

See application file for complete search history.

(56) References Cited

U.S. PATENT DOCUMENTS

| 2007/0274106 | A1* | 11/2007 | Coulson | ............ | H02M 3/33523 |
| | | | | | 363/21.12 |
| 2013/0077354 | A1* | 3/2013 | Behagel | ............ | H02M 3/33523 |
| | | | | | 363/21.01 |
| 2014/0301116 | A1* | 10/2014 | Zhang | ............... | H02M 3/33523 |
| | | | | | 363/21.15 |
| 2016/0373011 | A1* | 12/2016 | Kawashima | ............ | H02M 1/32 |
| 2017/0025957 | A1* | 1/2017 | Zhang | ............... | H02M 3/33507 |
| 2021/0328500 | A1* | 10/2021 | Lu | ........................ | H02M 1/0025 |

* cited by examiner

*Primary Examiner* — Fred E Finch, III
(74) *Attorney, Agent, or Firm* — Perkins Coie LLP (57) ABSTRACT

A method for controlling a switching mode power supply is disclosed. An auxiliary winding feedback voltage of the switching mode power supply is sampled and held to obtain an auxiliary winding sample hold voltage. The auxiliary winding feedback voltage is sampled and held at an inflection point time to obtain an auxiliary winding inflection point voltage when the switching mode power supply operates in DCM or CRM. A secondary rectifier forward voltage signal is generated based on the auxiliary winding sample hold voltage and the auxiliary winding inflection point voltage before the switching mode power supply operates in CCM. A correction voltage is provided based on the secondary rectifier forward voltage signal when the switching power supply operates in CCM. An error amplifier signal is generated based on the correction voltage. The output power of the switching mode power supply is adjusted based on the error amplifier signal.

18 Claims, 8 Drawing Sheets

CONTROL CIRCUIT OF SWITCHING MODE POWER SUPPLY AND CONTROL METHOD THEREOF

CROSS-REFERENCE TO RELATED APPLICATION(S)

The present application claims the benefit of and priority to a China Patent Application No. 202110865505.4 filed Jul. 29, 2021, which is hereby incorporated fully by reference into the present application

FIELD

The present invention relates generally to electronic circuits, and more particularly but not exclusively to voltage detection circuits of isolated switching mode power supply circuit and control methods thereof.

BACKGROUND

Figure 1:
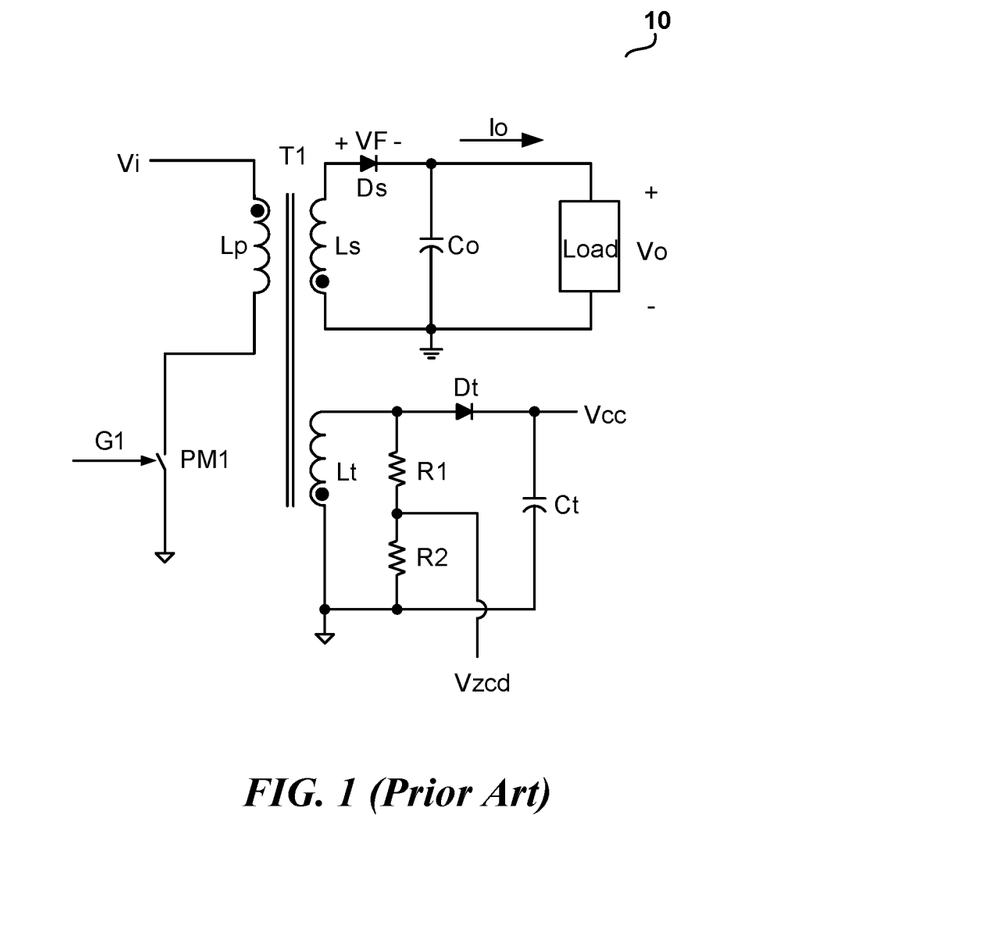
FIG. 1 illustrates a schematic diagram of a conventional flyback circuit 10.

A typical isolated switching mode power supply circuit is shown in FIG. 1, i.e., a flyback circuit 10 including a transformer T1, a primary circuit and a secondary circuit isolated from the primary circuit via the T1. As shown in FIG. 1, the transformer T1 includes a primary winding Lp and a secondary winding Ls, wherein the primary winding Lp receives the input voltage Vi and is coupled to a control switch PM1, and the secondary winding Ls provides the output voltage Vo. The primary circuit of the flyback circuit 10 includes devices and circuits coupled to the primary winding Lp, while the secondary circuit of the flyback circuit 10 includes devices and circuits coupled to the secondary winding Ls. Since the primary circuit is isolated from the secondary circuit, an isolated device such as a photocoupler is required to transmit signals between the primary circuit and the secondary circuit. In practical applications, in order to reduce the cost of the flyback circuit, primary-side regulation is often applied such that the isolated device is saved. However, in such cases, how to obtain the feedback information from a load of the secondary circuit to control the operations of primary circuit is a problem.

For an isolated switching mode power supply circuit with primary-side regulation, the conventional way to detect the feedback signal is shown in FIG. 1, i.e., obtaining the feedback signal Vzcd by sensing the voltage across the secondary winding Ls with an auxiliary winding Lt when the secondary diode Ds is turned on. However, in such a case, the sensed voltage across the auxiliary winding Lt is actually a sum of the output voltage Vo and a forward voltage VF of a secondary rectifier (e.g., a diode Ds). Since the forward voltage VF of the secondary diode Ds changes with the current flowing through the secondary diode Ds, the feedback voltage Vzcd could not correctly reflecting the output voltage Vo. Therefore, it is necessary to obtain the accurate feedback information representing the output voltage Vo.

SUMMARY

According to an embodiment of the present invention, a control circuit of a switching mode power supply is provided. The control circuit includes an inflection point sample and hold circuit, a first sample and hold circuit, a secondary rectifier forward voltage difference circuit, a second sample and hold circuit, and a correction circuit. The inflection point sample and hold circuit is configured to sample and hold an auxiliary winding feedback voltage at an inflection point time to obtain an auxiliary winding inflection point voltage when the switching power supply operates in DCM (discontinuous conduction mode) or CRM (critical conduction mode). The first sample and hold circuit is configured to sample and hold the auxiliary winding feedback voltage to obtain an auxiliary winding sample hold voltage. The secondary rectifier forward voltage difference circuit is configured to receive the auxiliary winding sample hold voltage and the auxiliary winding inflection point voltage, and provide a secondary rectifier forward voltage signal. The second sample and hold circuit is configured to receive a first selection signal, and sample and hold the secondary rectifier forward voltage signal to provide a forward voltage hold signal when the first selection signal indicates that the switching mode power supply operates in non-CCM (continuous conduction mode). The correction circuit is configured to receive a first voltage and the forward voltage hold signal, and to provide a correction voltage based on the first voltage and the forward voltage hold signal. When the switching mode power supply operates in CCM, the control circuit is configured to provide a switch control signal, based on the correction voltage, to control a control switch of the switching mode power supply. The first selection signal indicates that the switching mode power supply operates in CCM or non-CCM.

According to another embodiment of the present invention, a switching mode power supply is provided. The switching mode power supply includes a transformer, a control switch and a control circuit. The transformer includes a primary winding, a secondary winding coupled to a secondary rectifier, and an auxiliary winding configured to provide an auxiliary winding feedback voltage. The control switch is coupled to the primary winding, and the control switch is configured to receive a switch control signal and be controlled based on the switch control signal. The control circuit includes an inflection point sample and hold circuit, a first sample and hold circuit, a secondary rectifier forward voltage difference circuit, a second sample and hold circuit, and a correction circuit. The inflection point sample and hold circuit is configured to sample and hold the auxiliary winding feedback voltage at an inflection point time to obtain an auxiliary winding inflection point voltage when the switching power supply operates in DCM or CRM. The first sample and hold circuit is configured to sample and hold the auxiliary winding feedback voltage to obtain an auxiliary winding sample hold voltage. The secondary rectifier forward voltage difference circuit is configured to receive the auxiliary winding sample hold voltage and the auxiliary winding inflection point voltage, and to provide a secondary rectifier forward voltage signal. The second sample and hold circuit is configured to receive a first selection signal, and to sample and hold the secondary rectifier forward voltage signal to provide a forward voltage hold signal when the first selection signal indicates that the switching mode power supply operates in non-CCM. The correction circuit is configured to receive a first voltage and the forward voltage hold signal, and to provide a correction voltage based on the first voltage and the forward voltage hold signal. When the switching mode power supply operates in CCM, the control circuit is configured to provide the switch control signal based on the correction voltage. The first selection signal indicates that the switching mode power supply operates in CCM or non-CCM.

According to yet another embodiment of the present invention, a method for controlling a switching mode power supply is provided. The method includes the following steps.

An auxiliary winding feedback voltage of the switching mode power supply is sampled and held to obtain an auxiliary winding sample hold voltage. The auxiliary winding feedback voltage is sampled and held at an inflection point time to obtain an auxiliary winding inflection point voltage when the switching mode power supply operates in DCM or CRM. A secondary rectifier forward voltage signal is generated based on the auxiliary winding sample hold voltage and the auxiliary winding inflection point voltage before the switching mode power supply operates in CCM. A correction voltage is provided based on the secondary rectifier forward voltage signal when the switching power supply operates in CCM. An error amplifier signal is generated based on the correction voltage. The output power of the switching mode power supply is adjusted based on the error amplifier signal.

BRIEF DESCRIPTION OF THE DRAWINGS

The present invention can be further understood with reference to following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the phrases "in one embodiment", "in some embodiments", "in one implementation", and "in some implementations" as used includes both combinations and sub-combinations of various features described herein as well as variations and modifications thereof. These phrases used herein does not necessarily refer to the same embodiment, although it may. Those skilled in the art should understand that the meanings of the terms identified above do not necessarily limit the terms, but merely provide illustrative examples for the terms.

Figure 2:
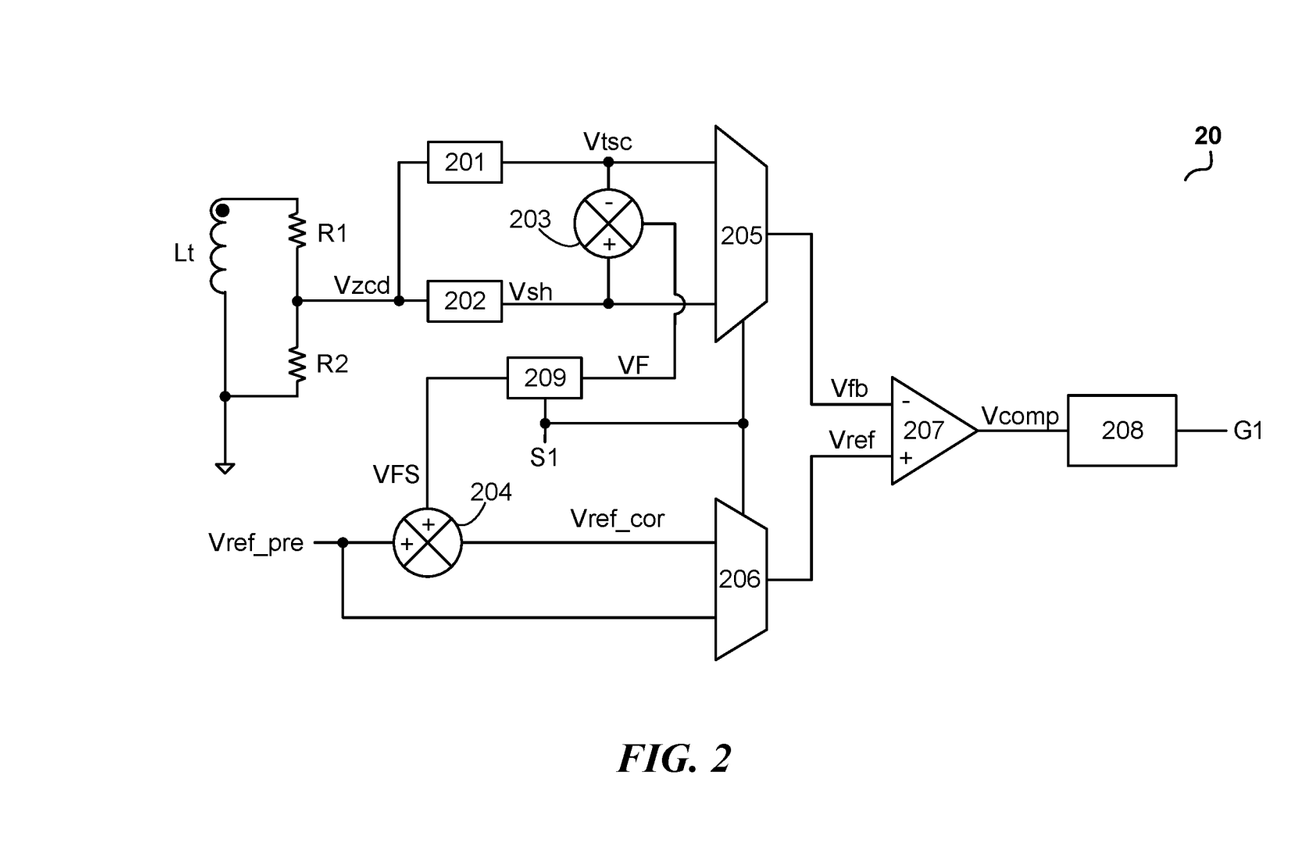
FIG. 2 illustrates a schematic diagram of a control circuit 20 of a switching mode power supply in accordance with an embodiment of the present invention.

FIG. 2 illustrates a schematic diagram of a control circuit 20 of a switching mode power supply in accordance with an embodiment of the present invention. As shown in FIG. 2, the control circuit 20 includes an inflection point sample and hold circuit 201, a first sample and hold circuit 202, a secondary rectifier forward voltage difference circuit 203, a second sample and hold circuit 209, a reference correction circuit 204, a first selection circuit 205, a second selection circuit 206, a differential amplifier circuit 207, and a switch control circuit 208. The inflection point sample and hold circuit 201 is configured to sample and hold an auxiliary winding feedback voltage Vzcd at an inflection point time to obtain an auxiliary winding inflection point voltage Vtsc when the switching power supply operates in DCM or CRM. The first sample and hold circuit 202 is configured to sample and hold the auxiliary winding feedback voltage Vzcd to obtain an auxiliary winding sample hold voltage Vsh. The secondary rectifier forward voltage difference circuit 203 is configured to receive the auxiliary winding sample hold voltage Vsh and the auxiliary winding inflection point voltage Vtsc, and to perform a subtraction operation to obtain the difference, i.e., a secondary rectifier forward voltage signal VF. The second sample and hold circuit 209 is configured to receive a mode selection signal S1, and to sample and hold the secondary rectifier forward voltage signal VF to provide a forward voltage hold signal VFS when the first selection signal indicates that the switching mode power supply operates in non-CCM. The reference correction circuit 204 is configured to receive a preset reference voltage Vref_pre and the forward voltage hold signal VFS, and to perform an addition operation to obtain the sum, i.e., a reference correction voltage Vref_cor. The first selection circuit 205 is configured to receive the auxiliary winding sample hold voltage Vsh, the auxiliary winding inflection point voltage Vtsc, and the mode selection signal S1, and to select between the auxiliary winding sample hold voltage Vsh and the auxiliary winding inflection point voltage Vtsc to provide the selected signal as the feedback voltage Vfb based on the mode selection signal S1. The second selection circuit 206 is configured to receive the reference correction voltage Vref_cor, the preset reference voltage Vref_pre, and the mode selection signal S1, and to select between the reference correction voltage Vref_cor and the preset reference voltage Vref_pre to provide the selected signal as the reference voltage Vref based on the mode selection signal S1. The differential amplifier circuit 207 is configured to receive the feedback voltage Vfb and the reference voltage Vref, and to provide an error amplifier signal Vcomp based on the feedback voltage Vfb and the reference voltage Vref. The switch control circuit 208 is configured to receive the error amplifier signal Vcomp, and to provide a switch control signal G1 based on the error amplifier signal Vcomp. The switch control signal G1 is configured to control the control switch PM1 of the switching mode power supply 10 as shown in FIG. 1. In one embodiment, the auxiliary winding feedback voltage Vzcd represents the voltage across the auxiliary winding Lt. In another embodiment, the auxiliary winding feedback voltage Vzcd represents the divided voltage of the voltage across auxiliary winding Lt, where the divided voltage could be realized by a voltage divider including resistors R1 and R2 as shown in FIG. 2. It is well understood by person having ordinary skills in the art, the voltage divider may be any circuits that provides an output voltage that is proportional to its input voltage.

When the switching mode power supply operates in DCM or CRM, at the moment when the secondary rectifier of the switching mode power supply turns off, the auxiliary winding feedback voltage Vzcd begins to drop, and the auxiliary winding feedback voltage Vzcd is sampled at the inflection point and held as the auxiliary winding inflection point voltage Vtsc. On the other hand, when the switching mode power supply operates in CCM, there is no inflection point. In the embodiment as shown in FIG. 2, the auxiliary winding feedback voltage Vzcd is sampled at the inflection point time by the inflection point sample and hold circuit 201.

In the embodiment as shown in FIG. 2, when the secondary rectifier (e.g., a diode Ds) is turned on, the auxiliary winding feedback voltage Vzcd represents the sum of the output voltage Vo of the switching mode power supply and the secondary rectifier forward voltage signal VF. On the other hand, when the switching mode power supply operates in DCM or CRM, at the inflection point time of the auxiliary winding feedback voltage Vzcd, i.e., the moment when the secondary rectifier Ds turns off, the current flowing through the secondary rectifier Ds is zero, that is, the voltage across the secondary rectifier Ds is zero (i.e., VF=0). In this case, the auxiliary winding feedback voltage Vzcd represents the output voltage Vo of the switching mode power supply. In other words, when the switching mode power supply operates in DCM or CRM, the auxiliary winding feedback voltage Vzcd is sampled at the inflection point time to obtain the auxiliary winding inflection point voltage Vtsc, which accurately represents the output voltage Vo of the switching mode power supply. However, when the switching mode power supply operates in CCM, when the secondary rectifier Ds is turned off, the current flowing through the secondary rectifier Ds is not equal to zero, and thus the forward voltage VF of the secondary rectifier Ds is also not equal to zero. That is, the auxiliary winding inflection point voltage Vtsc could not be sampled when the switching mode power supply operates in CCM since there is no inflection point. Therefore, in order to obtain the accurate feedback information representing the output voltage Vo when the switching mode power supply operates in CCM, it is necessary to obtain the forward voltage VF of the secondary rectifier Ds when the switching mode power supply operates in DCM or CRM, and eliminates the deviation caused by the forward voltage of the secondary rectifier Ds. In FIG. 1, the secondary rectifier Ds is a diode. It should be well understood by person having ordinary skills in the art that the secondary rectifier, in some embodiments of the present invention, may be realized by other controllable switches, such as, a MOSFET.

In the embodiment as shown in FIG. 2, the mode selection signal S1 may be a logic signal with different voltage levels representing various operating mode of the switching mode power supply. For instance, when the switching mode power supply operates in non-CCM (DCM or CRM), the mode selection signal S1 is a low voltage level, and the first selection circuit 205 selects and outputs the auxiliary winding inflection point voltage Vtsc as the feedback voltage Vfb. When the switching mode power supply operates in CCM, the mode selection signal S1 is a high voltage level, and the first selection circuit 205 selects and outputs the auxiliary winding sample hold voltage Vsh as the feedback voltage Vfb. It should be noted that the mode selection signal S1 is configured to represents different operating modes of the switching mode power supply, where the mode selection signal S1 may be realized by any suitable signals according to practical application circuits, and the present invention is not limited thereto. In one embodiment, the mode selection signal S1 may be any signal existed in a switching mode power supply. Additionally, the mode selection signal S1 may be generated in various ways. In one implementation, the mode selection signal S1 is generated by detecting the output current of the switching mode power supply. In another implementation, the mode selection signal S1 is generated by detecting the on time of the control switch of the switching mode power supply. In yet another implementation, the mode selection signal S1 is generated by detecting the off time of the control switch of the switching mode power supply. In some implementations, the mode selection signal S1 is generated by comparing the on time of the control switch of the switching mode power supply and the inflection point time of the auxiliary winding feedback voltage (i.e., the off time of the secondary rectifier).

In the embodiment as shown in FIG. 2, when the mode selection signal S1 indicates that the switching mode power supply operates in DCM or CRM, the auxiliary winding inflection point voltage Vtsc could accurately provide the feedback information representing the output voltage Vo since the forward voltage VF of the secondary rectifier Ds is equals to zero. As a result, the first selection circuit 205 selects and outputs the auxiliary winding inflection point voltage Vtsc as the feedback voltage Vfb, and the second selection circuit 206 selects and outputs a preset reference voltage Vref_pre as the reference voltage Vref. The feedback voltage Vfb and the reference voltage Vref are provided to the error amplifier 207 to obtain the error amplifier signal Vcomp. On the other hand, when the mode selection signal S1 indicates that the switching mode power supply operates in CCM, the first selection circuit 205 selects and outputs the auxiliary winding sample hold voltage Vsh as the feedback voltage Vfb, and the second selection circuit 206 selects and outputs the reference correction voltage Vref_cor as the reference voltage Vref. In other words, when the switching mode power supply operates in CCM, the deviation is eliminated by adding the forward voltage VF of the secondary rectifier Ds to the preset reference voltage Vref_pre. In order to provide a stable value of the forward voltage VF, a second sample and hold circuit 209, as shown in FIG. 2, may be included in one embodiment. The second sample and hold circuit 209 samples and holds the value of the forward voltage VF to obtain a forward voltage hold signal VFS when the first selection signal indicates that the switching mode power supply operates in non-CCM. In one embodiment, since the forward voltage VF may vary with the load conditions, it is sampled and hold when the switching mode power supply is about to operate in CCM. After the switching mode power supply operates in CCM, the value of the reference voltage Vref_pre is corrected with the forward voltage hold signal VFS to obtain the reference correction voltage Vref_cor, and the reference correction voltage Vref_cor and the auxiliary winding sample hold voltage Vsh selected as the feedback voltage Vfb are provided to the error amplifier to obtain the error amplifier signal Vcomp.

In the embodiment as shown in FIG. 2, the switch control circuit 208 receives the error amplifier signal Vcomp, and generates the switch control signal G1 for controlling the control switch PM1 of the switching mode power supply based on the error amplifier signal Vcomp. The switch control circuit 208 may include any control circuits suitable for adjusting the frequency of the switch control signal G1, any control circuits suitable for adjusting the duty cycle of the switch control signal G1, or any control circuits suitable for adjusting both the frequency and the duty cycle of the switch control signal G1. For example, the switch control circuit 208 is a peak current control circuit. In another implementation, the switch control circuit 208 is a voltage control circuit. In yet another implementation, the switch control circuit 208 is an average current control circuit. In some implementations, the switch control circuit 208 is a constant-on time control circuit. In some other implementations, the switch control circuit 208 is a constant-off time control circuit. However, the present invention is not limited thereto.

It should be noted that, in the present invention, the ratio of the number of turns of the primary winding, the secondary winding, and the auxiliary winding, is described as 1:1:1 for simplicity. However, in practical application, when the ratio of the number of turns of the primary winding, the secondary winding, and the auxiliary winding is Np:Ns:Nt, and the value of the corresponding signals should be adjusted accordingly. For instance, in one embodiment, the auxiliary winding feedback voltage Vzcd=R2/(R1+R2)×Nt/Ns×Vo. Moreover, the voltage/current signals of the present invention, such as the auxiliary winding feedback voltage Vzcd, the secondary rectifier forward voltage signal VF may be directly detected, or it could be also obtained after divided by a voltage divider. It should be well understood by person having ordinary skills in the art, the voltage divider is typically used according to the input/output amplitudes of the previous-stage or next-stage circuits, and the voltage divider is not shown in the present invention for simplicity purposes.

Figure 3:
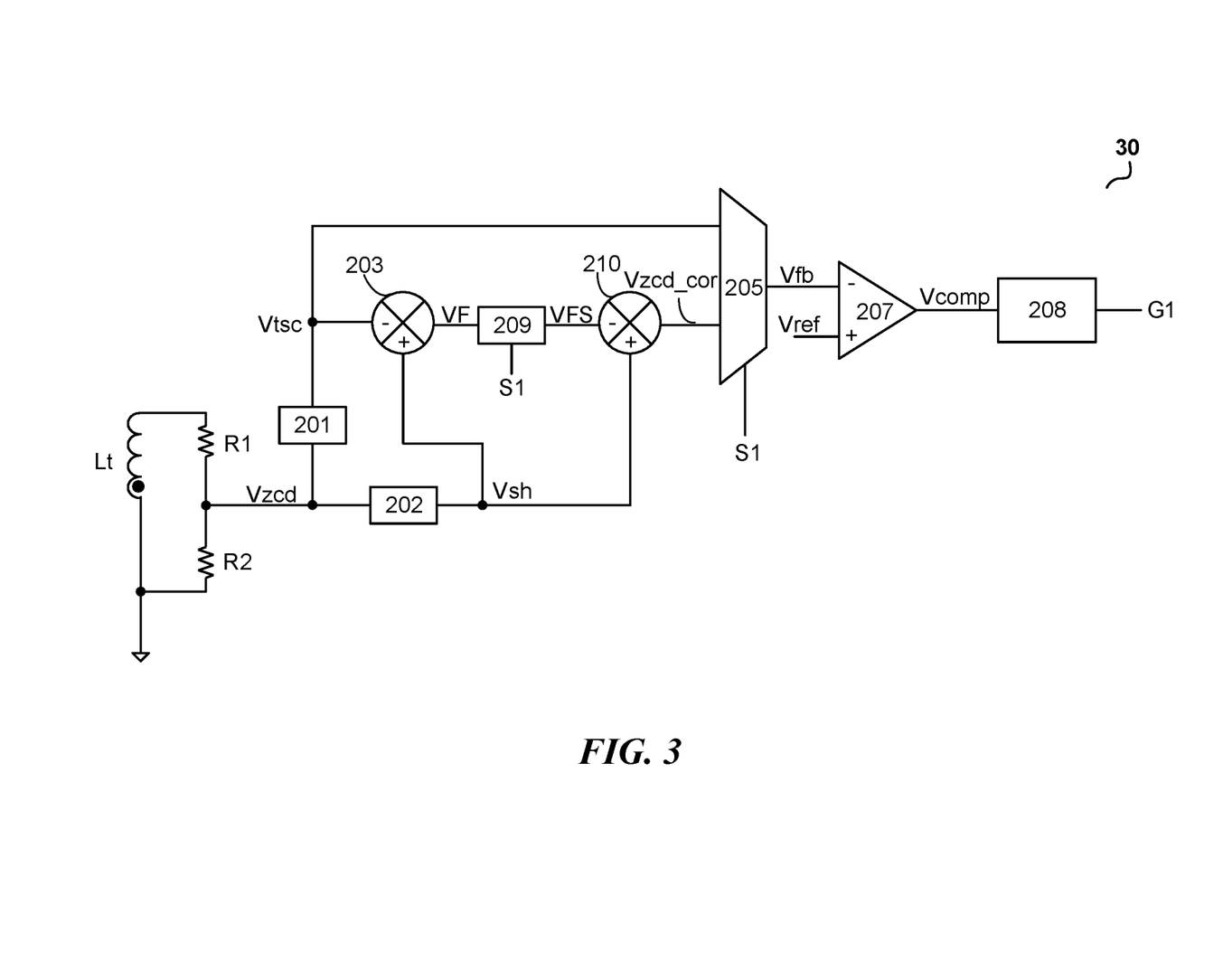
FIG. 3 illustrates a schematic diagram of a control circuit 30 of a switching mode power supply in accordance with an embodiment of the present invention.

FIG. 3 illustrates a schematic diagram of a control circuit 30 of a switching mode power supply in accordance with an embodiment of the present invention. As shown in FIG. 3, the control circuit 30 includes an inflection point sample and hold circuit 201, a first sample and hold circuit 202, a secondary rectifier forward voltage difference circuit 203, a second sample and hold circuit 209, a feedback correction circuit 210, a first selection circuit 205, a differential amplifier circuit 207, and a switch control circuit 208. The inflection point sample and hold circuit 201 is configured to sample and hold an auxiliary winding feedback voltage Vzcd at the inflection point time to obtain an auxiliary winding inflection point voltage Vtsc when the switching power supply operates in DCM or CRM. The first sample and hold circuit 202 is configured to sample and hold the auxiliary winding feedback voltage Vzcd to obtain an auxiliary winding sample hold voltage Vsh. The secondary rectifier forward voltage difference circuit 203 is configured to receive the auxiliary winding sample hold voltage Vsh and the auxiliary winding inflection point voltage Vtsc, and to perform a subtraction operation to obtain the difference, i.e., the secondary rectifier forward voltage signal VF. The second sample and hold circuit 209 is configured to receive a mode selection signal S1, and to sample and hold the secondary rectifier forward voltage signal before the mode selection signal S1 indicates that the switching power supply operates in CCM to obtain a forward voltage hold signal VFS. The feedback correction circuit 210 is configured to receive the auxiliary winding sample hold voltage Vsh and the forward voltage hold signal VFS, and to perform a subtraction operation to obtain the difference, i.e., the auxiliary winding correction voltage Vzcd_cor. The first selection circuit 205 is configured to receive the auxiliary winding inflection point voltage Vtsc, the auxiliary winding correction voltage Vzcd_cor, and the mode selection signal S1, and to select between the auxiliary winding inflection point voltage Vtsc and the auxiliary winding correction voltage Vzcd_cor to provide the selected signal as the feedback voltage Vfb based on the mode selection signal S1. The differential amplifier circuit 207 is configured to receive the feedback voltage Vfb and a reference voltage Vref, and to provide an error amplifier signal Vcomp based on the feedback voltage Vfb and the reference voltage Vref. The switch control circuit 208 is configured to receive the error amplifier signal Vcomp, and to provide a switch control signal G1 based on the error amplifier signal Vcomp.

In the embodiment as shown in FIG. 3, the forward voltage VF of the secondary rectifier Ds is applied to the auxiliary winding sample hold voltage Vsh, that is, when the switching mode power supply operates in CCM, the deviation is eliminated by subtracting the forward voltage VF of the secondary rectifier Ds from the auxiliary winding sample hold voltage Vsh.

Figure 4:
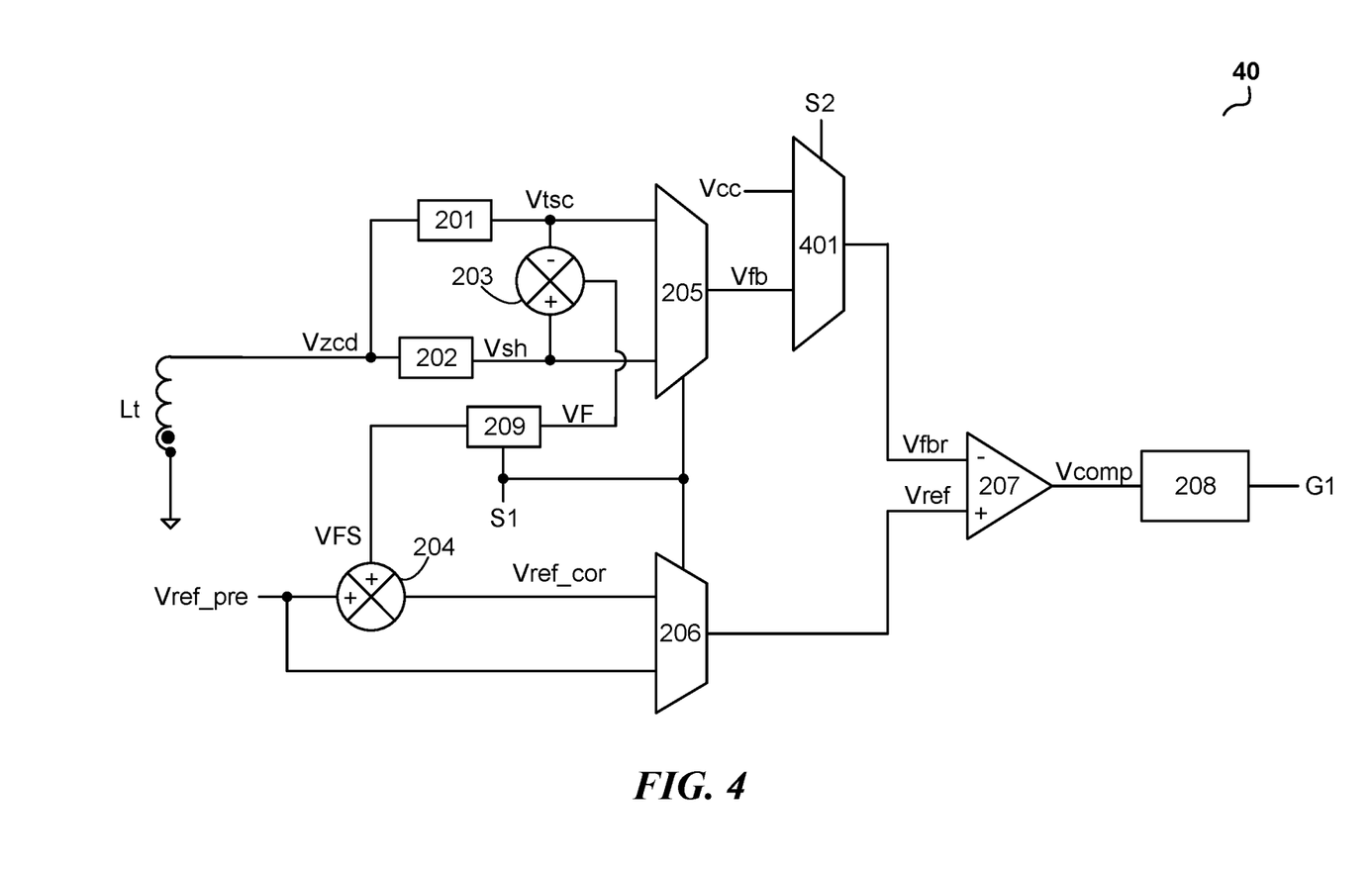
FIG. 4 illustrates a schematic diagram of a control circuit 40 of a switching mode power supply in accordance with an embodiment of the present invention.

FIG. 4 illustrates a schematic diagram of a control circuit 40 of a switching mode power supply in accordance with an embodiment of the present invention. The control circuit 40 has similar structures to the control circuit 20 as shown in FIG. 2. In this embodiment, the control circuit 40 further includes a third selection circuit 401. The third selection circuit 401 is configured to receive the feedback voltage Vfb, an auxiliary winding power supply voltage Vcc and a mode selection signal S2, and to select between the feedback voltage Vfb and the auxiliary winding power supply voltage Vcc to provide the selected signal as a feedback voltage Vfbr based on the mode selection signal S2. In the embodiment as shown in FIG. 4, the differential amplifier circuit 207 is configured to receive the feedback voltage Vfbr and the reference voltage Vref, and to provide the error amplifier signal Vcomp based on the feedback voltage Vfbr and the reference voltage Vref.

The auxiliary winding power supply voltage Vcc is the existed power supply voltage of the control circuit provided by the switching mode power supply with an auxiliary winding. As shown in FIG. 1, the auxiliary winding Lt charges the capacitor Ct via the auxiliary diode Dt to provide the auxiliary winding power supply voltage Vcc across the capacitor Ct. Under certain conditions such as when the switching mode power supply operates under high magnetic field, the freewheeling time of the secondary rectifier is shorter, and therefore the voltage across the auxiliary winding might be oscillating when it is sampled, or it could not be sampled. In such cases, the value of the auxiliary winding feedback voltage Vzcd may not correctly reflect the load condition. When the mode selection S2 indicates that the auxiliary winding feedback voltage Vzcd is oscillating, the control circuit 40 selects and outputs the auxiliary winding power supply voltage Vcc as the feedback voltage Vfbr via the third selection circuit 401 to control the feedback loop. It should be noted that the auxiliary winding power supply voltage Vcc is generated by the voltage across the auxiliary winding Lt filtered by the auxiliary diode Dt and the capacitor Ct. Thus, the value of the auxiliary winding power supply voltage Vcc is more stable. As a result, when the value of the auxiliary winding feedback voltage Vzcd oscillates and could not correctly reflect the load condition, the auxiliary winding power supply voltage Vcc may be used as the feedback voltage.

In the embodiment as shown in FIG. 4, the mode selection signal S2 be configured in various ways. For instance, it is generated by detecting the value of the auxiliary winding feedback voltage Vzcd, when the value of which exceeds a range (e.g., Vcc×80%-Vcc×120%), which means that the auxiliary winding feedback voltage Vzcd is oscillating, the third selection circuit 401 selects the auxiliary winding power supply voltage Vcc as the feedback voltage Vfbr based on the mode selection signal S2. Alternatively, the third selection circuit 401 selects, based on the mode selection signal S2, the feedback voltage Vfb to control the feedback loop when the value of the auxiliary winding feedback voltage Vzcd is within the range (e.g., Vcc×80%–Vcc×120%). In some embodiments, the mode selection signal S2 is generated by obtaining the time duration starting from the moment when the secondary rectifier Ds turns on to the inflection point of the voltage across the auxiliary winding Lt. For example, when the time duration is less than a value, it is determined that the auxiliary winding feedback voltage Vzcd is oscillating, the third selection circuit 401 selects, based on the mode selection signal S2, the auxiliary winding power supply voltage Vcc as the feedback voltage Vfbr. Alternatively, the third selection circuit 401 selects, based on the mode selection signal S2, the feedback voltage Vfb to control the feedback loop when the time duration is greater than or equal to the value. In some other embodiments, the mode selection signal S2 may include any signals indicating that the auxiliary winding feedback voltage Vzcd is oscillating.

It should be noted that in this embodiment, the auxiliary winding feedback voltage Vzcd represents the voltage across the auxiliary winding Lt, and the auxiliary winding power supply voltage Vcc is provided as the feedback voltage Vfbr when the auxiliary winding feedback voltage Vzcd is oscillating. In some embodiments, the auxiliary winding feedback voltage Vzcd represents the divided voltage of the voltage across auxiliary winding Lt, and therefore the value of the auxiliary winding power supply voltage Vcc provided to the third selection circuit is adjusted according to the divided voltage ratio.

Figure 5:
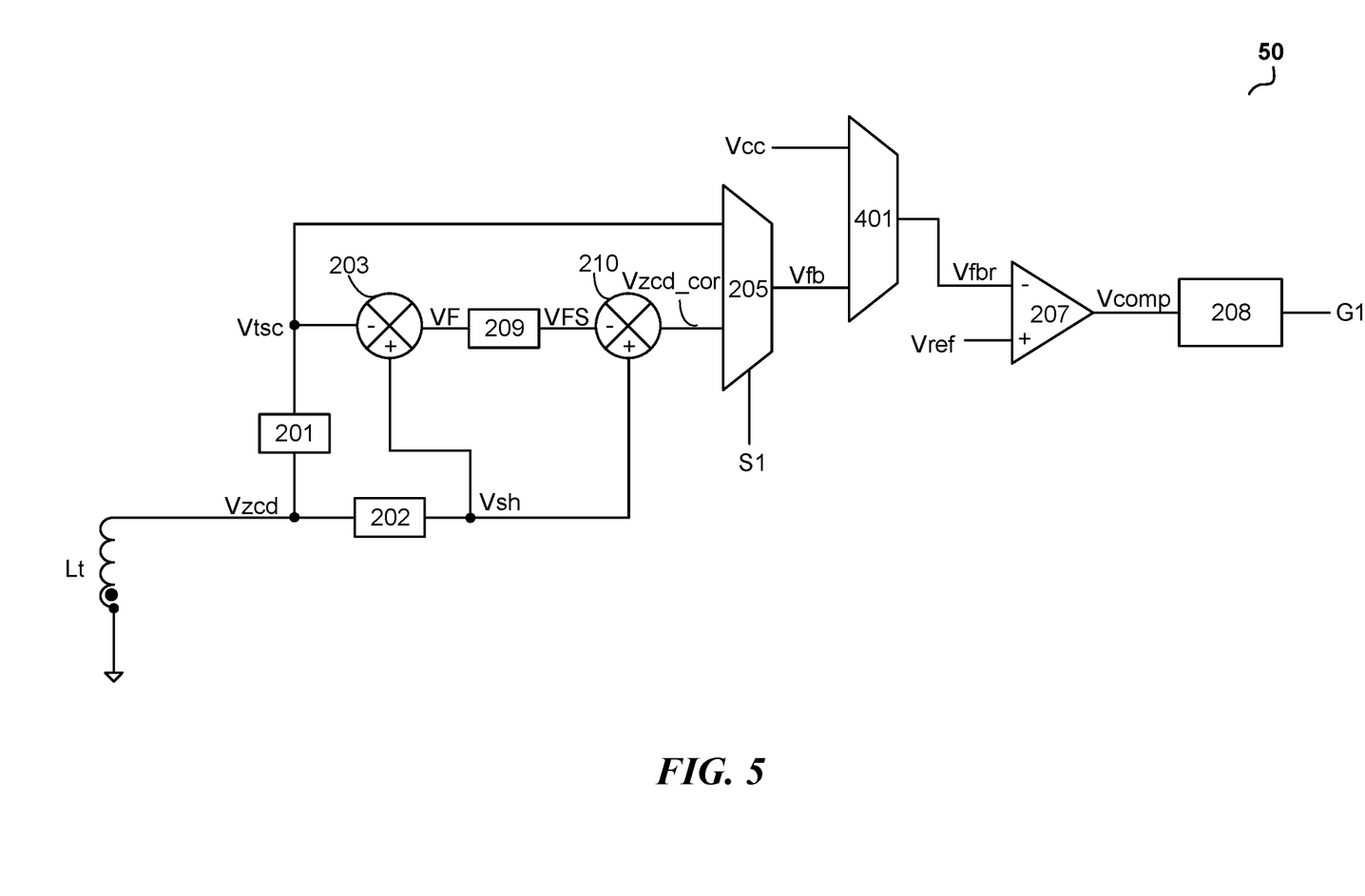
FIG. 5 illustrates a schematic diagram of a control circuit 50 of a switching mode power supply in accordance with an embodiment of the present invention.

FIG. 5 illustrates a schematic diagram of a control circuit 50 of a switching mode power supply in accordance with an embodiment of the present invention. The control circuit 50 has similar structures to the control circuit 30 as shown in FIG. 3. In this embodiment, the control circuit 50 further includes a third selection circuit 401. The third selection circuit 401 is configured to receive the feedback voltage Vfb, an auxiliary winding power supply voltage Vcc and a mode selection signal S2, and to select between the feedback voltage Vfb and the auxiliary winding power supply voltage Vcc to provide the selected signal as the feedback voltage Vfbr based on the mode selection signal S2. In the embodiment as shown in FIG. 5, the differential amplifier circuit 207 is configured to receive the feedback voltage Vfbr and the reference voltage Vref, and to provide the error amplifier signal Vcomp based on the feedback voltage Vfbr and the reference voltage Vref.

Figure 6:
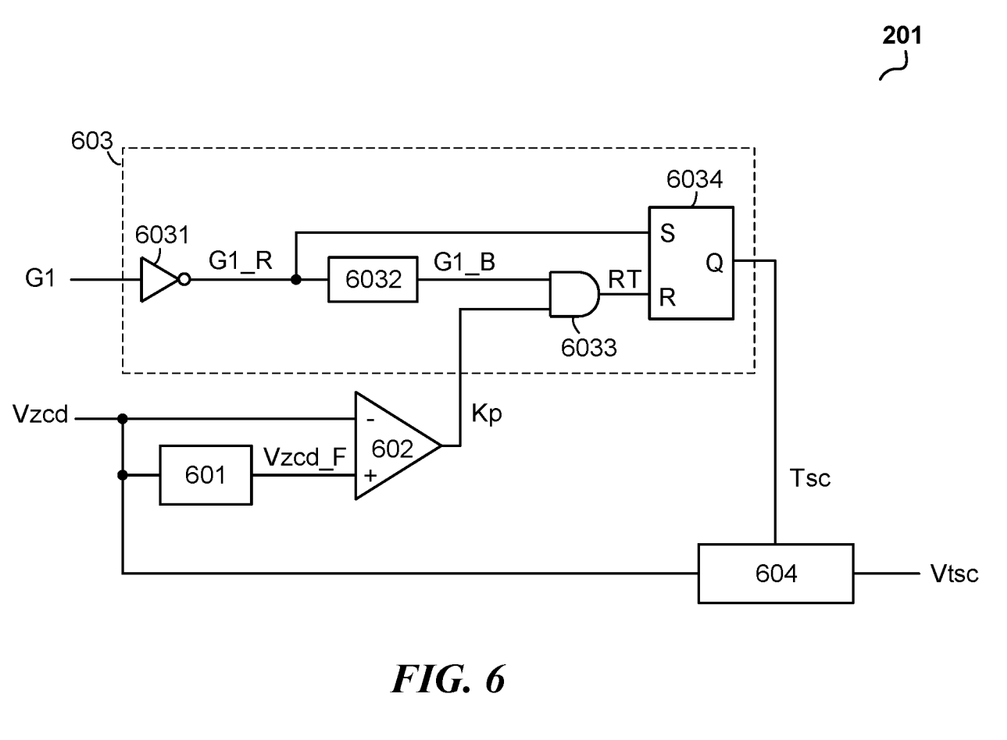
FIG. 6 illustrates a schematic diagram of an inflection point sample and hold circuit 201 in accordance with an embodiment of the present invention.

FIG. 6 illustrates a schematic diagram of an inflection point sample and hold circuit 201 in accordance with an embodiment of the present invention. As shown in FIG. 6, the inflection point sample and hold circuit 201 includes a filter circuit 601, a comparator circuit 602, a logic circuit 603, and a sample and hold circuit 604. The filter circuit 601 is configured to receive and filter the auxiliary winding feedback voltage Vzcd, and to provide an auxiliary winding feedback filter voltage Vzcd_F. The comparator circuit 602 is configured to receive and compare the auxiliary winding feedback voltage Vzcd and the auxiliary winding feedback filter voltage Vzcd_F, and to provide a comparison signal Kp based on the comparison result. The logic circuit 603 is configured to receive and perform a logic operation on the switch control signal G1 and the comparison signal Kp and to provide an inflection point time signal Tsc based on the logic operation result. The sample and hold circuit 604 is configured to receive the inflection point time signal Tsc and the auxiliary winding feedback voltage Vzcd, and to sample and hold the auxiliary winding feedback voltage Vzcd to obtain the auxiliary winding inflection point voltage when the inflection point time signal Tsc indicates that an inflection point of the auxiliary winding feedback voltage Vzcd occurs.

In the embodiment as shown in FIG. 6, the logic circuit 603 includes an inverter circuit 6031, a blanking circuit 6032, a logic gate 6033 and a RS flip-flop 6034. The inverter circuit is configured to receive the switch control signal G1 and to provide the inverted signal G1_R of the switch control signal G1. The blanking circuit 6032 is configured to receive the inverted signal G1_R, and to provide the blanking signal G1_B. The logic gate 6033 is configured to receive and perform a logic operation on the blanking signal G1_B and the comparison signal Kp, and to provide a reset signal RT. The RS flip-flop 6034 is configured to receive the inverted signal G1_R at the set terminal S and receive the reset signal RT at the reset terminal R, and to provide the inflection point time signal Tsc at the output terminal Q.

When the switching mode power supply operates in DCM, the inflection point sample and hold circuit 201 is configured to sample and hold the voltage across the auxiliary winding Lt at the moment when the secondary rectifier Ds turns off (i.e., when the current flowing through the secondary rectifier Ds is equal to zero) to obtain the auxiliary winding inflection point voltage Vtsc.

Figure 7:
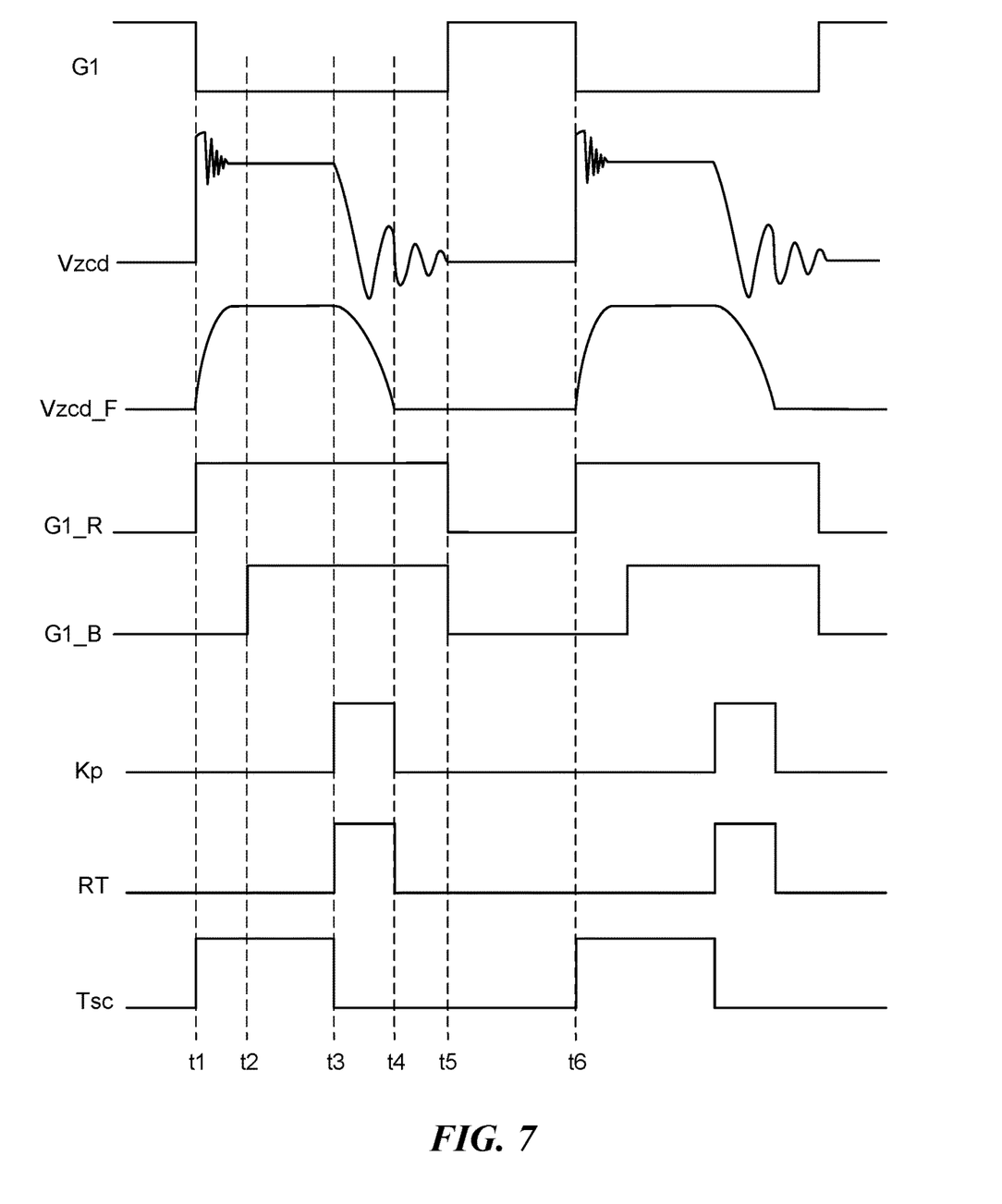
FIG. 7 illustrates a schematic diagram of a waveform of multiple signals of the inflection point sample and hold circuit 201 in accordance with an embodiment of the present invention.

FIG. 7 illustrates a schematic diagram of a waveform of multiple signals of the inflection point sample and hold circuit 201 in accordance with an embodiment of the present invention. The working principle of the inflection point sample and hold circuit 201 is described as follows with reference to FIGS. 6 and 7.

Suppose t1 as shown in FIG. 7 is the beginning time of one switch cycle of the switching mode power supply. As shown in FIG. 7, at time t1, the voltage level of the switch control signal G1 changes from high to low, and thus the control switch PM1 turns off. Meanwhile, the secondary rectifier Ds and the auxiliary diode Dt both turn on, and thus the auxiliary winding feedback voltage Vzcd turns high, and the oscillation may occur as shown in FIG. 7. At the same time, the auxiliary winding feedback filter voltage Vzcd_F begins to increase gradually, and then reaches a stable value after a period of time. Therefore the voltage level of the inverted signal G1_R switches from low to high, and sets the RS flip-flop 6034 to provide the inflection point time signal Tsc shifted from low to high. At time t2, the voltage level of the blanking signal G1_B changes from low to high, that is, the blanking signal G1_B changes from low to high after the inverted signal G1_R changes from low to high with a delay time. The delay time is typically greater than the time during the auxiliary winding feedback voltage Vzcd is oscillating. It should be noted that, in one switch cycle of the switching mode power supply, the blanking circuit 6032 merely delay the switching from low to high after the control switch PM1 turns off, in other words, the blanking signal G1_B blanks the oscillation of the auxiliary winding feedback voltage Vzcd. At time t3, the secondary rectifier Ds turns off, the inflection point of the auxiliary winding feedback voltage Vzcd occurs, and thus the auxiliary winding feedback filter voltage Vzcd_F is greater than the auxiliary winding feedback voltage Vzcd, the comparison signal Kp switches from low to high. Since the voltage level of the blanking signal G1_B is high, the voltage level of the reset signal RT turns high via the logic operation performed by the AND gate

6033. Therefore, the RS flip-flop 6034 is reset and provide the inflection point time signal Tsc from high to low. At time t4, the auxiliary winding feedback filter voltage Vzcd_F is less than the auxiliary winding feedback voltage Vzcd, the voltage level of the comparison signal Kp turns low, and thus the voltage level of the reset signal RT also turns low. At time t5, the voltage level of the switch control signal G1 changes from low to high, and thus the control switch PM1 turns on, which leads to the oscillation of the auxiliary winding feedback voltage Vzcd. Meanwhile, the voltage levels of inverted signal G1_R and the blanking signal G1_B both switch from high to low. At time t6, the voltage level of the switch control signal G1 changes from high to low again, the control switch PM1 turns off, and the next cycle begins.

The sample and hold circuit 604 is configured to receive the inflection point time signal Tsc, and to sample and hold the auxiliary winding feedback voltage Vzcd to obtain the auxiliary winding inflection point voltage at the falling edge of the inflection point time signal Tsc, i.e., the inflection point time t3.

It should be well understood that the inflection point sample and hold circuit 201 as shown in FIG. 6 is only for illustration purpose, and the present invention is not limited thereto. Each element of the inflection point sample and hold circuit 201 may be adjusted according to various types of signals. For instance, the inflection point sample and hold circuit 201 may be realized without the inverter circuit 6031 when a low voltage level of the switch control signal G1 indicates that the control switch PM1 is turned on, and a high voltage level of which indicates that the control switch PM1 is turned off. In another implementation, the auxiliary winding feedback voltage Vzcd is provided to the non-inverting input node of the comparator circuit 602 and the auxiliary winding feedback filter voltage Vzcd_F is provided to the inverting input node of the comparator circuit 602, the inverter circuit 6031 is not required, the logic gate 6033 is the NOR gate instead of the AND gate, and the set terminal S and the reset terminal R of the RS flip-flop 6034 are triggered at the falling edge. In some implementations, if the auxiliary winding feedback voltage Vzcd is sampled and held at the rising edge of the inflection point time signal Tsc, the circuit configured for generating the inflection point time signal Tsc will be adjusted correspondingly. It is well understood that in the present invention, when the switching mode power supply operates in DCM or CRM, the inflection point sample and hold circuit 201 is configured to sample and hold the auxiliary winding feedback voltage Vzcd at the inflection point time of the auxiliary winding feedback voltage Vzcd, i.e., the moment when the secondary rectifier Ds turns off, to obtain the auxiliary winding inflection point voltage Vtsc.

In the embodiment as shown in FIG. 6, the blanking circuit 6032 is optional. That is, in one embodiment, the inverted signal G1_R is directly provided to the logic gate 6033.

Figure 8:
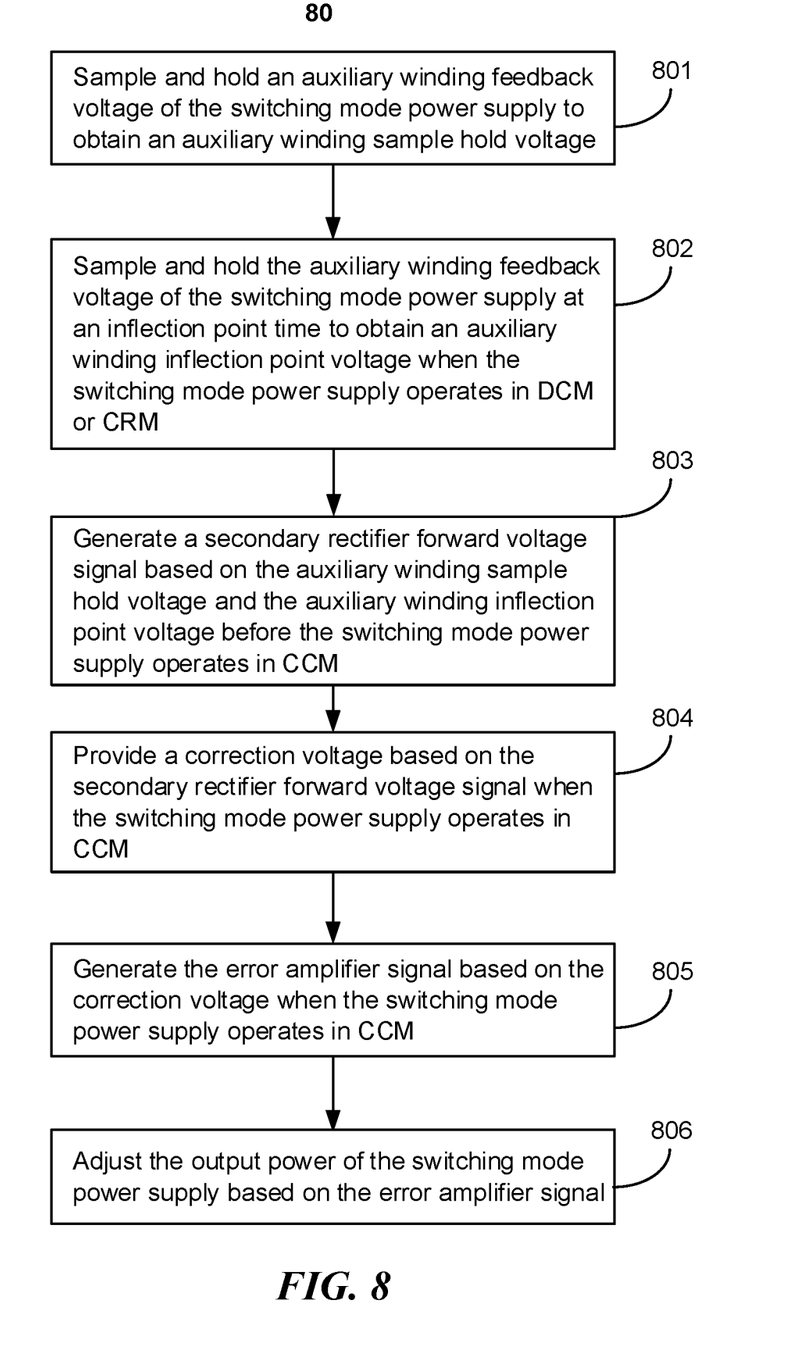
FIG. 8 illustrates a flowchart of a method 80 for controlling a switching mode power supply in accordance with an embodiment of the present invention.

FIG. 8 illustrates a flowchart of a method 80 for controlling a switching mode power supply in accordance with an embodiment of the present invention. The method 80 may be configured for controlling an isolated switching mode power supply, e.g., as shown in FIG. 1. The method may include the following steps.

In step 801, an auxiliary winding feedback voltage of the switching mode power supply is sampled and held to obtain an auxiliary winding sample hold voltage.

In step 802, when the switching mode power supply operates in DCM or CRM, the auxiliary winding feedback voltage of the switching mode power supply is sampled and held at an inflection point time to obtain an auxiliary winding inflection point voltage.

In step 803, before the switching mode power supply operates in CCM, a secondary rectifier forward voltage signal is generated based on the auxiliary winding sample hold voltage and the auxiliary winding inflection point voltage.

In step 804, when the switching mode power supply operates in CCM, a correction voltage is provided based on the secondary rectifier forward voltage signal.

In step 805, the error amplifier signal is generated based on the correction voltage when the switching power supply operates in CCM. Alternatively, when the switching mode power supply operates in DCM or CRM, the error amplifier signal is generated based on a reference voltage and the auxiliary winding inflection point voltage.

In step 806, the output power of the switching mode power supply is adjusted based on the error amplifier signal.

In one embodiment, the provided correction voltage is a reference correction voltage, the reference voltage is corrected based on the secondary rectifier forward voltage signal, and the error amplifier signal is generated based on the corrected reference voltage and the auxiliary winding sample hold voltage.

In another embodiment, the provided correction voltage is an auxiliary winding correction voltage, the auxiliary winding sample hold voltage is corrected based on the secondary rectifier forward voltage signal, and the error amplifier signal is generated based on the auxiliary winding correction voltage and the reference voltage.

In one embodiment, the step 802 includes the following steps. In step 8021, when the switching mode power supply operates in DCM or CRM, the auxiliary winding feedback voltage is filtered to generate the auxiliary winding feedback filter voltage. In step 8022, the auxiliary winding feedback voltage is compared with the auxiliary winding feedback filter voltage to provide a comparison result. In step 8023, the inflection point time of the auxiliary winding feedback voltage is determined based on the comparison result of the auxiliary winding feedback voltage and the auxiliary winding feedback filter voltage, where the inflection point time is the moment when the auxiliary winding feedback filter voltage is greater than the auxiliary winding feedback voltage, i.e., at the falling edge of the inflection point time signal Tsc. In step 8024, the auxiliary winding feedback voltage is sampled and held at the inflection point time to obtain the auxiliary winding inflection point voltage.

It is well understood that the above steps of method 80 could be performed in any orders.

Based on the above, several control circuits of isolated switching mode power supply and control method thereof are disclosed. By sampling the voltage across the auxiliary winding of the switching mode power supply at various time, the secondary rectifier forward voltage is obtained, and the secondary rectifier forward voltage could be removed from the detected voltage across the auxiliary winding to obtain the accurate feedback information representing the output voltage. The proposed method and isolated switching mode power supply could be applied to any operating word, such as CCM, CRM and DCM.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. A control circuit of a switching mode power supply, comprising:
   an inflection point sample and hold circuit configured to sample and hold an auxiliary winding feedback voltage at an inflection point time to obtain an auxiliary winding inflection point voltage when the switching power supply operates in DCM (discontinuous conduction mode) or CRM (critical conduction mode);
   a first sample and hold circuit configured to sample and hold the auxiliary winding feedback voltage to obtain an auxiliary winding sample hold voltage;
   a secondary rectifier forward voltage difference circuit configured to receive the auxiliary winding sample hold voltage and the auxiliary winding inflection point voltage, and to provide a secondary rectifier forward voltage signal;
   a second sample and hold circuit configured to receive a first selection signal, and to sample and hold the secondary rectifier forward voltage signal to provide a forward voltage hold signal when the first selection signal indicates that the switching mode power supply operates in non-CCM (continuous conduction mode); and
   a correction circuit configured to receive a first voltage and the forward voltage hold signal, and to provide a correction voltage based on the first voltage and the forward voltage hold signal;
   wherein when the switching mode power supply operates in CCM, the control circuit is configured to provide a switch control signal, based on the correction voltage, to control a control switch of the switching mode power supply;
   wherein the first selection signal indicates that the switching mode power supply operates in CCM or non-CCM.

2. The control circuit of claim 1, wherein the first voltage is a preset reference voltage, and the correction voltage is a reference correction voltage;
   wherein when the switching mode power supply operates in CCM, the control circuit is configured to provide the switch control signal based on the reference correction voltage and the auxiliary winding sample hold voltage;
   and wherein when the switching mode power supply operates in DCM or CRM, the control circuit is configured to provide the switch control signal based on the preset reference voltage and the auxiliary winding inflection point voltage.

3. The control circuit of claim 2, further comprising:
   a first selection circuit configured to receive the auxiliary winding sample hold voltage, the auxiliary winding inflection point voltage, and the first selection signal, and to select one of the auxiliary winding sample hold voltage and the auxiliary winding inflection point voltage as a first feedback voltage based on the first selection signal;
   a second selection circuit configured to receive the reference correction voltage, the preset reference voltage, and the first selection signal, and to select one of the reference correction voltage and the preset reference voltage as a reference voltage based on the first selection signal;
   a differential amplifier circuit configured to receive the first feedback voltage and the reference voltage, and to provide an error amplifier signal based on the first feedback voltage and the reference voltage; and
   a switch control circuit configured to receive the error amplifier signal, and to provide the switch control signal based on the error amplifier signal.

4. The control circuit of claim 2, further comprising:
   a first selection circuit configured to receive the auxiliary winding sample hold voltage, the auxiliary winding inflection point voltage, and the first selection signal, and to select one of the auxiliary winding sample hold voltage and the auxiliary winding inflection point voltage to provide the selected signal based on the first selection signal;
   a second selection circuit configured to receive the reference correction voltage, the preset reference voltage, and the first selection signal, and to select one of the reference correction voltage and the preset reference voltage as a reference voltage based on the first selection signal;
   a third selection circuit configured to receive the selected signal provided by the first selection circuit, an auxiliary winding power supply voltage and a second selection signal, and to select one of the selected signal provided by the first selection circuit and the auxiliary winding power supply voltage as a first feedback voltage based on the second selection signal;
   a differential amplifier circuit configured to receive the first feedback voltage and the reference voltage, and to provide an error amplifier signal based on the first feedback voltage and the reference voltage; and
   a switch control circuit configured to receive the error amplifier signal, and to provide the switch control signal based on the error amplifier signal.

5. The control circuit of claim 1, wherein the inflection point sample and hold circuit comprises:
   a filter circuit configured to receive and filter the auxiliary winding feedback voltage, and to provide an auxiliary winding feedback filter voltage;
   a comparator circuit configured to receive and compare the auxiliary winding feedback voltage and the auxiliary winding feedback filter voltage, and to provide a comparison signal based on the comparison result;
   a logic circuit configured to receive and perform a logic operation on the switch control signal and the comparison signal, and to provide an inflection point time signal based on the logic operation result; and
   a sample and hold circuit configured to receive the inflection point time signal and the auxiliary winding feedback voltage, and to sample and hold the auxiliary winding feedback voltage to obtain the auxiliary winding inflection point voltage when the inflection point time signal indicates that an inflection point of the auxiliary winding feedback voltage occurs.

6. The control circuit of claim 1, wherein the first voltage is the auxiliary winding sample hold voltage, and the correction voltage is an auxiliary winding correction voltage;
   wherein when the switching mode power supply operates in CCM, the control circuit is configured to provide the switch control signal based on a reference voltage and the auxiliary winding correction voltage;
   and wherein when the switching mode power supply operates in DCM or CRM, the control circuit is configured to provide the switch control signal based on the reference voltage and the auxiliary winding inflection point voltage.

7. The control circuit of claim 6, further comprising:
a first selection circuit configured to receive the auxiliary winding inflection point voltage, the auxiliary winding correction voltage, and the first selection signal, and to select one of the auxiliary winding inflection point voltage and the auxiliary winding correction voltage as a first feedback voltage based on the first selection signal;
a differential amplifier circuit configured to receive the first feedback voltage and the reference voltage, and to provide an error amplifier signal based on the first feedback voltage and the reference voltage; and
a switch control circuit configured to receive the error amplifier signal, and to provide the switch control signal based on the error amplifier signal.

8. The control circuit of claim 6, further comprising:
a first selection circuit configured to receive the auxiliary winding inflection point voltage, the auxiliary winding correction voltage, and the first selection signal, and to select one of the auxiliary winding inflection point voltage and the auxiliary winding correction voltage and to provide the selected signal based on the first selection signal;
a third selection circuit configured to receive the selected signal provided by the first selection circuit, an auxiliary winding power supply voltage and a second selection signal, and to select one of between the selected signal provided by the first selection circuit and the auxiliary winding power supply voltage as a first feedback voltage based on the second selection signal;
a differential amplifier circuit configured to receive the first feedback voltage and the reference voltage, and to provide an error amplifier signal based on the first feedback voltage and the reference voltage; and
a switch control circuit configured to receive the error amplifier signal, and to provide the switch control signal based on the error amplifier signal.

9. A switching mode power supply, comprising:
a transformer comprising:
  a primary winding;
  a secondary winding coupled to a secondary rectifier; and
  an auxiliary winding configured to provide an auxiliary winding feedback voltage;
a control switch coupled to the primary winding, wherein the control switch is configured to receive a switch control signal and be controlled based on the switch control signal; and
a control circuit, comprising:
  an inflection point sample and hold circuit configured to sample and hold the auxiliary winding feedback voltage at an inflection point time to obtain an auxiliary winding inflection point voltage when the switching power supply operates in DCM or CRM;
  a first sample and hold circuit configured to sample and hold the auxiliary winding feedback voltage to obtain an auxiliary winding sample hold voltage;
  a secondary rectifier forward voltage difference circuit configured to receive the auxiliary winding sample hold voltage and the auxiliary winding inflection point voltage, and to provide a secondary rectifier forward voltage signal;
  a second sample and hold circuit configured to receive a first selection signal, and to sample and hold the secondary rectifier forward voltage signal to provide a forward voltage hold signal when the first selection signal indicates that the switching mode power supply operates in non-CCM; and
  a correction circuit configured to receive a first voltage and the forward voltage hold signal, and to provide a correction voltage based on the first voltage and the forward voltage hold signal;
wherein when the switching mode power supply operates in CCM, the control circuit is configured to provide the switch control signal based on the correction voltage;
wherein the first selection signal indicates that the switching mode power supply operates in CCM or non-CCM.

10. The switching mode power supply of claim 9, wherein the first voltage is a preset reference voltage, and the correction voltage is a reference correction voltage;
wherein when the switching mode power supply operates in CCM, the control circuit is configured to provide the switch control signal based on the reference correction voltage and the auxiliary winding sample hold voltage;
and wherein when the switching mode power supply operates in DCM or CRM, the control circuit is configured to provide the switch control signal based on the preset reference voltage and the auxiliary winding inflection point voltage.

11. The switching mode power supply of claim 10, wherein the control circuit further comprises:
a first selection circuit configured to receive the auxiliary winding sample hold voltage, the auxiliary winding inflection point voltage, and the first selection signal, and to select one of the auxiliary winding sample hold voltage and the auxiliary winding inflection point voltage as a first feedback voltage based on the first selection signal;
a second selection circuit configured to receive the reference correction voltage, the preset reference voltage, and the first selection signal, and to select one of the reference correction voltage and the preset reference voltage as a reference voltage based on the first selection signal;
a differential amplifier circuit configured to receive the first feedback voltage and the reference voltage, and to provide an error amplifier signal based on the first feedback voltage and the reference voltage; and
a switch control circuit configured to receive the error amplifier signal, and to provide the switch control signal based on the error amplifier signal.

12. The switching mode power supply of claim 10, wherein the control circuit further comprises:
a first selection circuit configured to receive the auxiliary winding sample hold voltage, the auxiliary winding inflection point voltage, and the first selection signal, and to select one of the auxiliary winding sample hold voltage and the auxiliary winding inflection point voltage to provide the selected signal based on the first selection signal;
a second selection circuit configured to receive the reference correction voltage, the preset reference voltage, and the first selection signal, and to select one of the reference correction voltage and the preset reference voltage as a reference voltage based on the first selection signal;
a third selection circuit configured to receive the selected signal provided by the first selection circuit, an auxiliary winding power supply voltage and a second selection signal, and to select one of the selected signal provided by the first selection circuit and the auxiliary winding power supply voltage as a first feedback voltage based on the second selection signal;

a differential amplifier circuit configured to receive the first feedback voltage and the reference voltage, and to provide an error amplifier signal based on the first feedback voltage and the reference voltage; and a switch control circuit configured to receive the error amplifier signal, and to provide the switch control signal based on the error amplifier signal.

13. The switching mode power supply of claim 9, wherein the inflection point sample and hold circuit comprises:

a filter circuit configured to receive and filter the auxiliary winding feedback voltage, and provide an auxiliary winding feedback filter voltage;

a comparator circuit configured to receive and compare the auxiliary winding feedback voltage and the auxiliary winding feedback filter voltage, and to provide a comparison signal based on the comparison result;

a logic circuit configured to receive and perform a logic operation on the switch control signal and the comparison signal, and to provide an inflection point time signal based on the logic operation result; and a sample and hold circuit configured to receive the inflection point time signal and the auxiliary winding feedback voltage, and to sample and hold the auxiliary winding feedback voltage to obtain the auxiliary winding inflection point voltage when the inflection point time signal indicates that an inflection point of the auxiliary winding feedback voltage occurs.

14. The switching mode power supply of claim 9, wherein the first voltage is the auxiliary winding sample hold voltage, and the correction voltage is an auxiliary winding correction voltage;

wherein when the switching mode power supply operates in CCM, the control circuit is configured to provide the switch control signal based on a reference voltage and the auxiliary winding correction voltage;

and wherein when the switching mode power supply operates in DCM or CRM, the control circuit is configured to provide the switch control signal based on the reference voltage and the auxiliary winding inflection point voltage.

15. The switching mode power supply of claim 14, wherein the control circuit further comprises:

a first selection circuit configured to receive the auxiliary winding inflection point voltage, the auxiliary winding correction voltage, and the first selection signal, and to select one of the auxiliary winding inflection point voltage and the auxiliary winding correction voltage as a first feedback voltage based on the first selection signal;

a differential amplifier circuit configured to receive the first feedback voltage and the reference voltage, and to provide an error amplifier signal based on the first feedback voltage and the reference voltage; and a switch control circuit configured to receive the error amplifier signal, and to provide the switch control signal based on the error amplifier signal.

16. The switching mode power supply of claim 14, wherein the control circuit further comprises:

a first selection circuit configured to receive the auxiliary winding inflection point voltage, the auxiliary winding correction voltage, and the first selection signal, and to select one of the auxiliary winding inflection point voltage and the auxiliary winding correction voltage to provide the selected signal based on the first selection signal;

a third selection circuit configured to receive the selected signal provided by the first selection circuit, an auxiliary winding power supply voltage and a second selection signal, and to select one of between the selected signal provided by the first selection circuit and the auxiliary winding power supply voltage as a first feedback voltage based on the second selection signal;

a differential amplifier circuit configured to receive the first feedback voltage and the reference voltage, and to provide an error amplifier signal based on the first feedback voltage and the reference voltage; and a switch control circuit configured to receive the error amplifier signal, and to provide the switch control signal based on the error amplifier signal.

17. A method for controlling a switching mode power supply, comprising:

sampling and holding an auxiliary winding feedback voltage of the switching mode power supply to obtain an auxiliary winding sample hold voltage;

sampling and holding the auxiliary winding feedback voltage at an inflection point time to obtain an auxiliary winding inflection point voltage when the switching mode power supply operates in DCM or CRM;

generating a secondary rectifier forward voltage signal based on the auxiliary winding sample hold voltage and the auxiliary winding inflection point voltage before the switching mode power supply operates in CCM;

providing a correction voltage based on the secondary rectifier forward voltage signal when the switching mode power supply operates in CCM;

generating an error amplifier signal based on the correction voltage;

adjusting an output power of the switching mode power supply based on the error amplifier signal;

wherein the correction voltage is an auxiliary winding correction voltage provided further based on the auxiliary winding sample hold voltage;

wherein when the switching mode power supply operates in CCM, the error amplifier signal is generated based on the auxiliary winding correction voltage and a reference voltage; and wherein when the switching mode power supply operates in DCM or CRM, the error amplifier signal is generated based on the auxiliary winding inflection point voltage and the reference voltage.

18. The method of claim 17, wherein the step of sampling and holding the auxiliary winding feedback voltage at the inflection point time to obtain the auxiliary winding inflection point voltage further comprises:

filtering the auxiliary winding feedback voltage to generate an auxiliary winding feedback filter voltage when the switching mode power supply operates in DCM or CRM;

comparing the auxiliary winding feedback voltage and the auxiliary winding feedback filter voltage to provide a comparison result;

determining the inflection point time based on the comparison result; and sampling and holding the auxiliary winding feedback voltage to obtain the auxiliary winding inflection point voltage at the inflection point time.

* * * * *